United States Patent [19]

Gillitzer et al.

[11] 4,061,899
[45] Dec. 6, 1977

[54] ARRANGEMENT FOR STABILIZATION AND IGNITION OF WELDING ARCS BY IGNITION PULSES

[75] Inventors: Max Gillitzer, Munich; Franz Tajbl, Oberschleissheim, both of Germany

[73] Assignee: Messer Griesheim GmbH, Germany

[21] Appl. No.: 622,629

[22] Filed: Oct. 15, 1975

[30] Foreign Application Priority Data
Oct. 18, 1974 Germany .............................. 2449557

[51] Int. Cl.² .............................................. B23K 9/06
[52] U.S. Cl. ................................ 219/131 R; 315/206; 315/209 CD; 315/222; 315/226
[58] Field of Search .......... 219/131 R, 131 WR, 135; 315/206, 209 CD, 209 SC, 219, 220, 222, 223, 226, 256, 278, 227 R, 246

[56] References Cited
U.S. PATENT DOCUMENTS

| | | | |
|---|---|---|---|
| 3,551,741 | 12/1970 | Tajbl et al. | 219/131 R |
| 3,637,974 | 1/1972 | Tajbl et al. | 219/135 |
| 3,749,973 | 7/1973 | Canup | 315/222 |
| 3,780,258 | 12/1973 | Iceland et al. | 219/135 |
| 3,824,429 | 7/1974 | Davalillo | 315/209 SC |
| 3,921,606 | 11/1975 | Habert | 315/209 CD |

Primary Examiner—Gerald P. Tolin
Assistant Examiner—Clifford C. Shaw
Attorney, Agent, or Firm—Connolly and Hutz

[57] ABSTRACT

Welding arc stabilizing and igniting is effected with at least one pulse-forming condenser switched by spark gap or semiconductor switch to deliver a sharp discharge pulse through the winding of a pulse transformer, the magnetic energy thus built up in the transformer being then dissipated by a unidirectional diode bypass of the winding through the switch. The pulses are delivered by the transformer to the welding electrodes, and can be combined with pulses of lower voltage and longer duration by an appropriate series condenser-resistor combination in the transformer output. The pulse-forming condenser can be charged by simple resistor connection to the input of a step-down welding current transformer, or by transformer coupling to any source of AC welding current. Trigger means can also be connected as by transformer coupling for operation from the welding current to trigger the pulse discharge switching at the appropriate times in the current waves, although the triggering can be effected through the use of voltage-dependent pulse switching and the charging of the pulse forming condensers to voltages at least as high as that needed to actuate the switching. The switching means can also be protected by a blocking condenser in series in the output of a pulse-forming condenser, and the blocking condenser can be bridged by a resistor to bleed off the charge developed in the blocking condenser by a discharge pulse.

5 Claims, 12 Drawing Figures

ARRANGEMENT FOR STABILIZATION AND IGNITION OF WELDING ARCS BY IGNITION PULSES

This invention concerns an arrangement for stabilizing an alternating current welding arc, as well as for igniting AC or DC welding arcs.

It is known to superimpose a high frequency voltage on an AC welding voltage. This comparatively high additional voltage assures a re-ignition of the welding arc every time the AC welding voltage passes through a null, and thus stabilizes the arc. It is additionally known to use the high-frequency voltage to ignite an AC or DC welding arc. The particular advantage of such an ignition technique is that the electrode needs only to be brought a distance of for example 2 to 4 mm from the workpiece for ignition, without directly contacting it.

However such high frequency voltages which are continuously superimposed on the arc generate radio and television interference which is frequently above the authorized limits. This disadvantage has promoted the development of techniques and equipment with which to stabilize and ignite the welding arc with only a small number of ignition pulses from time to time at the correct instant, between the electrode and the workpiece.

For welding with AC there have for example been developed for this specific use, switches which effect the application of momentary ignition pulses each time immediately after the AC welding voltage passes through the null point (U.S. Pat. No. 2,880,376, German Pat. Nos. 1,002,097 and 1,061,006). With these known welding-arc stabilizing and igniting apparatuses, ignition condensers are used which become discharge intermittently between electrode and workpiece through a switch in the form of a spark gap. The ignition pulses thus always have the same polarity as the igniting half waves of the AC welding voltage. The energy for the ignition pulses are in these known techniques taken from the welding circuit so that the timed control of the ignition pulses in this way can be a simple established relation to the timed dropping off of the welding voltage.

The last-described welding arc stabilizing and igniting process has in use proved satisfactory and meets the requirements of the regulatory provisions with respect to radio and television interference. It also has, however, some disadvantages the elimination of which appears desirable.

In this connection the significant question is the energy generation for the development of ignition pulses. This energy is, as already mentioned, taken from the welding circuit. This action can cause disturbing oscillation effects on the welding circuit.

Another disadvantage of the known apparatus is that in the tolerably quick closure of the switches (spark gaps) used for the discharge circuit of the ignition condenser, the stress of the total ignition pulse energy is continually applied. It is therefore necessary to frequently adjust or replace these components. Furthermore it is essential that the entire switch unit subjected to the ignition pulse be built to withstand the full ignition voltage. This makes a proportionally larger expense and - together with the wear on the switch — it follows that there is an increase in the cost of the equipment.

U.S. Pat. No. 3,551,741, German Auslegeschrift 1,615,363 as well as 1,937,879, German Pat. Nos. 1,002,097 and 1,061,006, and German Offenlegungsschrift 2,235,751 describe arrangements for avoiding the described disadvantages by which the ignition condenser is on one side in parallel to a charging current source, and on the other side is in a discharge circuit which has at least one controllable switch (semi-conductor). Such arrangements are particularly favorable with regard to the ignition pulse generation.

The foregoing prior art also shows arrangements by which two controllable semi-conductors and two ignition condensers produce ignition pulses of alternating polarity matching the polarity of the welding current half-waves on which they are superimposed, and also shows arrangements for dissipating the energy stored in a pulse transformer when it is used for transmitting an ignition pulse, to keep that energy from causing uncontrollable damped free oscillations. These are undesirable, particularly to meet the applicable regulations concerning radio and television interference.

Among the objects of the present invention is the provision of new and improved combinations for stabilizing AC welding arcs and igniting AC or DC welding arcs, which combinations are highly effective and particularly desirable to construct.

A feature of the present invention is the short-circuiting of the primary winding of a pulse transformer through a discharge path formed by the pulsing switch and a rectifier, to more desirably dissipate the energy accumulated in the pulse transformer during the ignition pulse transmission.

Such a discharge path provides a particularly advantageous short-circuiting of the magnetic energy, with more effective avoidance of oscillation. It is accordingly possible to have a simpler manufacture of the ignition apparatus, especially the pulse generation portion, and moreover providing ignition pulses having less free oscillations and having the same polarity as the half waves to be ignited.

It is also possible according to the present invention to have an optimal dimensioning and use of switches where the magnitude of the pulses exerts no influence on the switches. This is particularly important when the switches are made of semi-conductor elements which are preferred according to the present invention, and which as compared with the state of the art can now be used to control pulses having voltages as high as double the maximum switch voltage. It is thus advantageous for pulse powers of 10 to 15 amperes at 7500 volts to use quick-acting switches, relatively small thyristors that can switch 4 to 6 amperes at 800 volts instead of thyristor pulse currents of about 100 amperes. According to the present invention semi-conductor construction elements are understood to be those such as thyristors, thyristor diodes, transistors, dynistors, PUT and similar elements.

It is also self-evident that, according to the present invention, advantageous arrangements can be used with spark-gap pulsing switches or tubes.

Moreover, because the transmission of reverse pulse current to the welding current circuit is more fully avoided, interference with adjacent radio channels is nearly completely prevented.

According to one embodiment of the present invention an ignition condenser is connected with a charging current source that delivers direct current, one pole of the ignition condenser is tied to a mid-point tap on a primary transformer winding while both ends of the primary winding are connected through pulsing separate switches to the other pole of the condenser. Furthermore, one of the primary winding portions is connected in a first shorting circuit in series with its pulsing switch and also with a rectifier, while the other primary winding is connected in a second shorting circuit in series with its pulsing switch and with a rectifier (FIGS. 1 and 2).

A second preferred embodiment of the present invention provides for charging the ignition condenser and the connection of that condenser to a discharge circuit having two rectifiers each in series with a separate pulsing switch and with the primary winding of a pulse transformer, and two bypass rectifiers are also connected in the discharge circuit each in series with the respective switches and with the primary winding.

According to the present invention it is also advantageous to produce ignition pulses through the discharge of an ignition condenser at each of the two welding current half waves to correspond in polarity with these half waves, and having a duration of approximately between 0.3 and 3 microseconds whereby these short durations are controlled by welding current inductors of 400 to 500 microhenrys for peak pulse voltages of 3,000 to 4,000 volts, or having longer pulse durations (1 to 10 microseconds) controlled by welding current inductors of 400 to 800 microhenrys for peak voltages of 3,000 to 6,000 volts.

Because the magnetic energy accumulated in the pulse transformer exerts no oscillation influence on the ignition pulses, in a short time an oscillation-free ignition pulse falls to the null value. It is then particularly advantageous to superimpose on the high voltage ignition pulse a low voltage pulse of longer duration by means of which the drop-off time of the ignition pulses is controllably and adjustably prolonged. In this connection the present invention proposes that the secondary circuit of the pulse transformer be provided with a series-connected condenser and resistor to develop such low-voltage pulse. The condenser and registor are, according to the invention, of such values that the duration of the low-voltage pulse is approximately between 10 and 50 microseconds.

As to the capacitance value of the low-voltage-pulse condenser, it is proposed that this be at least 4 times the capacitance value of the ignition condenser. In apparatus with semi-conductor switches the capacitance value is, for example, ten times that of the ignition condenser. In apparatus with spark gaps the low-voltage pulse condenser can have a capacity in the range of from 2 microfarads to 16 microfarads.

By means of the low-voltage pulses according to the present invention, there is obtained the advantage that in spite of the short high-voltage pulse duration (about 0.3 to 10 microseconds) which is particularly advantageous for the small amount of interference with adjacent transmission channels, a relatively long time (about 25 microseconds) is available for the build-up of the welding arc.

Additional details and advantageous features of the present invention are given in the following description of working examples as well as in the claims.

In the individual illustrations:

Figure 1:
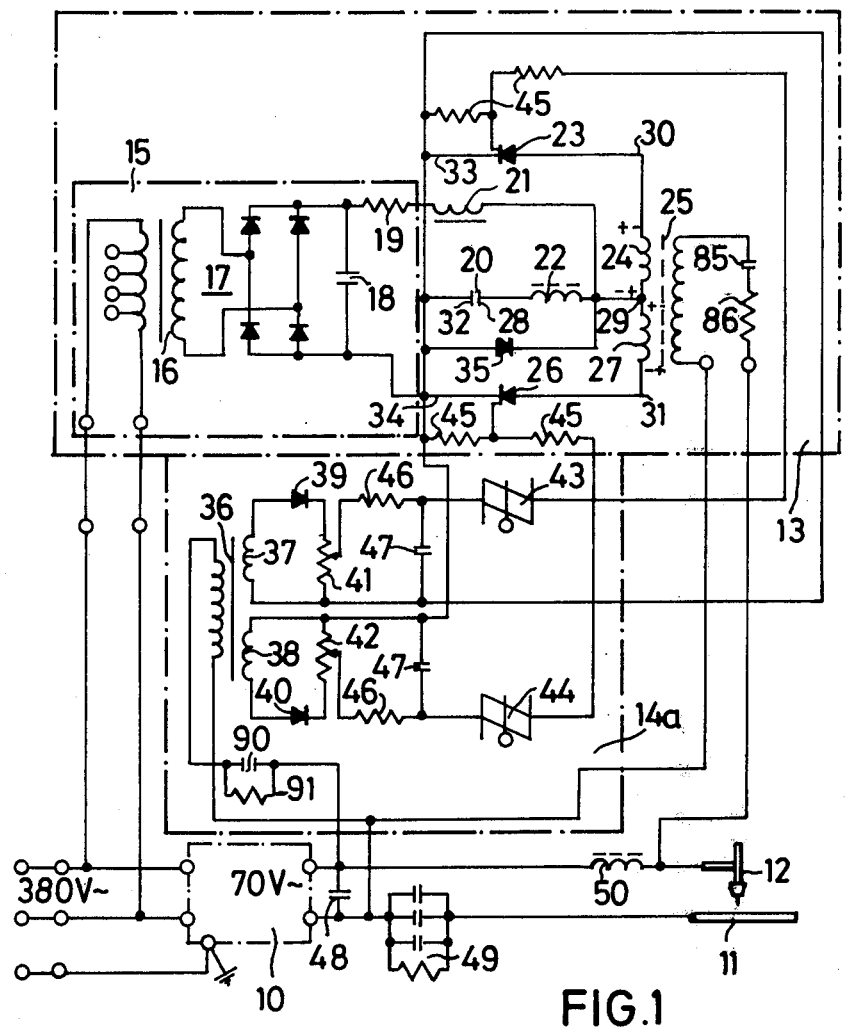
FIG. 1 to 7 are diagrams of circuits for the stabilization and ignition of AC or DC welding arcs pursuant to the present invention.

In FIG. 1 there is illustrated an AC welding current source 10, a workpiece 11, a burner electrode 12, a power unit 13 for the production of pulses, and a trigger unit 14a for the timewise control of the pulses. The power unit 13 is at its input connected to the welding current source 10, specifically through a charging current source 15 which essentially has an isolation transformer 16 whose primary is connected to the input of the welding source 10. The secondary of transformer 16 is connected with a bridge rectifier 17 and with a smoothing unit which includes resistor 19 and condenser 18. By such construction of the charging current source 15, a direct current is applied to ignition condenser 20 connected in parallel to that source.

The ignition condenser 20 is preferably supplied with charging circuit through a charging inductor 21 and an interference-suppression inductor 22. The inductor 22 serves to so delay the current rise $di/dt$ that it is below the highest permissible value of the thyristors 23, 26 that are used.

The ignition condenser discharge circuit consists of two discharge portions, one for each welding current half wave; one discharge circuit portion including the ignition condenser 20, the interference-suppression inductor 22, a first thyristor switch 23 as well as a first primary winding 24 of a pulse transformer 25, and the other discharge circuit portion likewise includes the ignition condenser 20, the interference suppression inductor 22 as well as a second thyristor switch 26 and a second primary winding 27.

The plus terminal 28 of ignition condenser 20 is thus connected through interference-suppression inductor 22 of the two separate portions of the primary windings 24, 27 of the pulse transformer. The ends 30, 31 of the primary windings 24, 27 connect through the thyristor switches 23, 26 respectively, to the minus terminal 32 of the ignition condenser 20. In this way the thyristors 23, 26 are so switched that their cathodes 33, 34 remain connected together.

In addition, the first primary winding 24 becomes a first current shorting path shown in series as the winding 24, thyristor 23, as well as rectifier 35. The second primary winding 27 is similarly in a current shorting path having the winding 27, the second thyristor 26, as well as the rectifier 35, in series. These current shorting paths are each unidirectional and provide for dissipating the magnetic energy accumulated in the pulse transformer 25 by the ignition pulse generation, which energy would otherwise produce pulses of reverse polarity.

The secondary of pulse transformer 25 is connected through condenser 85 and resistor 86 with the welding current circuit. The trigger unit 14a for thyristors 23, 26 has a transformer 36 with its primary connected to the welding current voltage, and with two mutually isolated secondary windings 37, 38 which are connected by means of diodes 39, 40 respectively and potentiometers 41, 42 respectively. Diodes 39, 40 are push-pull connected. Each tap of potentiometers 41, 42 can be connected through a resistor 46 and ignition control condenser 47 with a voltage-dependent switch element for example a four-layer diode 43, 44. The output signals of diodes 43, 44 which pass through resistors 45 serve as trigger or switch pulses for the thyristors 23, 26. By means of the potentiometers 41, 42 the beginning of the trigger pulses and thus the ignition pulses, as well as the height of the working voltage at which the ignition pulse is provided during the welding, can be adjustably set for each half wave.

In the welding current circuit there is in parallel across the output of the current source 10 a condenser 48 to use the welding current source 10 for pulse voltage peaking. Moreover a condenser battery 49 is connected in the welding circuit to compensate for the rectifying action on the AC welding current when welding aluminum.

For coupling of the ignition pulses an inductor 50, for example a ferrite core inductor, is in the welding circuit. Particularly desirable is a ferrite core inductor of from 400 to 800 microhenrys for maximum welding current strengths of about 180, 350 and 650 amperes.

Figure 2:
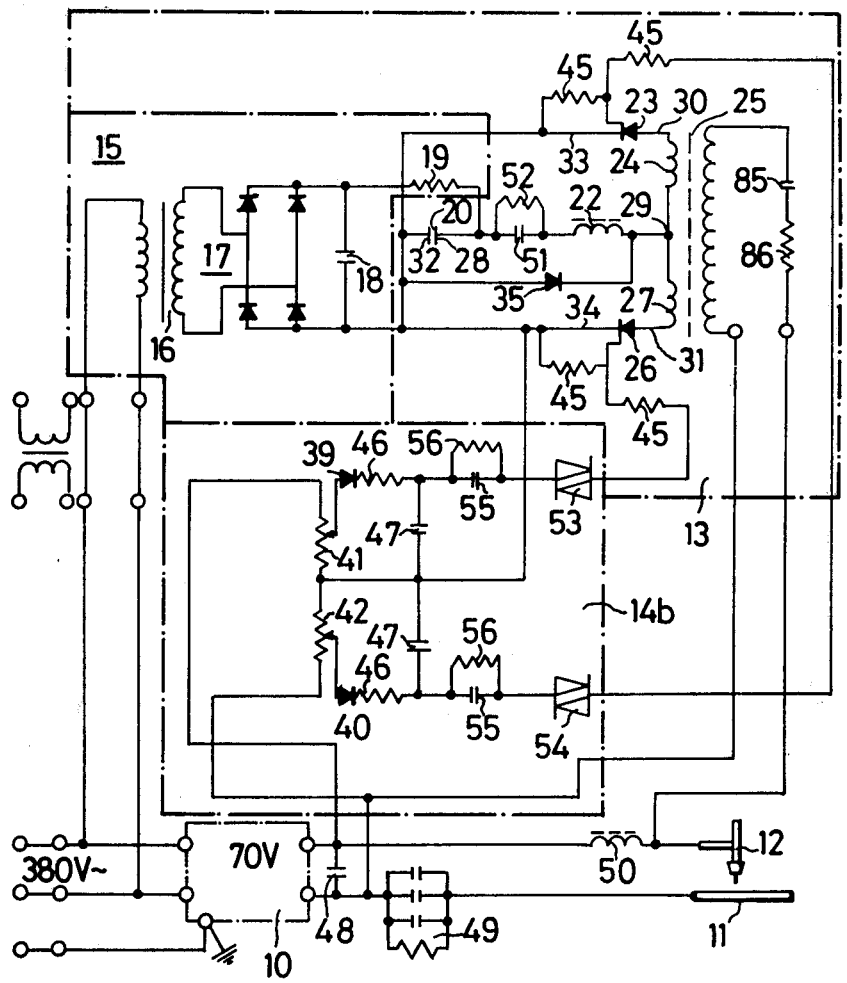

The examplification of the invention illustrated in FIG. 2 corresponds essentially to the exemplification of FIG. 1 and corresponding elements are shown with corresponding reference characters. Instead of the charging inductor 21 shown in FIG. 1, the ignition condenser 20 of FIG. 2 has an isolation condenser 51 in series in its discharge circuit, the isolation condenser being bridged by a discharge resistor 52. This isolation condenser 51 is charged at each discharge of ignition condenser 20 until the voltages across condensers 20 and 51 are equally high but opposite, and the discharge current from condenser 20 is going toward null. By this means it is assured that thyristors 23, 26 are securely blocked after each ignition pulse. The isolation condenser is thereafter discharged through the discharge resistor 52 in a short period of time (for example 10 milliseconds), so that the isolation condenser 51 operates correspondingly in the following half wave. This combination of isolation condenser 51 and discharge resistance 52 is a preferred substitute for the charge inductor 21.

The trigger unit 14b of FIG. 2 also does not show an input transformer; the generation of trigger pulses is taken over by DIAC switches 53, 54, which are voltage-dependent switches. In this way, in every welding half wave, only one control pulse is generated and it is applied in parallel to condenser 47 which is also shown with an added isolation condenser 55 bridged by a discharge resistor 56.

The combinations described in FIGS. 1 and 2 operate to stabilize and ignite a welding AC current arc in the following way:

I. Stabilizing

From the DC current charging source 15 the condenser 20 is charged up. The intermittent discharging of condenser 20 follows at the moment the thyristor 23 receives a control pulse at its trigger unit 14a and 14b. These control pulses are synchronized at the moment immediately after a half wave of the AC welding voltage goes through a null. The condenser 20 discharges itself then through the circuit that comprises the inductor 20, the primary winding 24 and the thyristor 23, whereby for example a positive-going ignition pulse results in the pulse transformer to stabilize the positive welding half waves.

After the discharge of the ignition condenser 20, its instantaneous recharging is hindered by the charging inductor 21 of FIG. 1 or by the isolation condenser 51 of FIG. 2, so that in a definite time the discharge current through thyristor 23 reduces to zero and after the expiration of its release time (about 10 to about 50 microseconds) the thyristor 23 switches off.

At the same time pulse transformer becomes magnetized particularly during the discharge of the ignition condenser. After the ignition condenser can no longer deliver a voltage to the pulse transformer 25, the pulse transformer becomes a generator, the voltage on its winding 24 reverses its polarity and the accumulated energy is discharged as a current pulse. This current pulse is not transformed at the secondary of the pulse transformer 25 and thus not applied to the welding current circuit. Instead this current pulse is discharged by the short-circuiting of winding 24 through the discharge circuit comprising the still conductive thyristor 23, the diode 35, and the winding 24. This takes place before the thyristor 23 is switched off.

The ignition condenser 20 is then again charged up by the charging current source 15. The discharge of condenser 20 now follows through the triggering of thyristor 26, whereby there is a negative-going ignition pulse applied to winding 27 of the pulse transformer to stabilize the negative welding half waves. Again energy is accumulated in the pulse transformer which energy is discharged through the discharge path consisting of the thyristor 26 which is still conductive immediately after the discharge of condenser 20, the diode 35, as well as the winding 27.

The above-described sequence corresponds as a whole to one period of the welding AC current, such as an AC current of 50 Hertz having a period of 20 milliseconds. During this period there is transmitted by the pulse transformer one ignition pulse for each current half wave. The energy accumulated in the transformer because of the pulses is however not transformed to the secondary side but is dissipated through the momentarily effective by-pass circuits. There are accordingly produced ignition pulses without oscillations, and the character of their decay is not influenced by the residual magnetic energy.

II. Ignition

The described arrangement applies without change to any welding installation that has diversified requirements for igniting the arc. The one difference is that for ignition the ignition pulse should be generated by the trigger unit 14a or b shortly before the peak free-running voltage maximum of the welding current source 10. Ignition energy is also accumulated in pulse transformer 25 and according to the present invention is dissipated as in the stabilization of the arc.

The arrangements illustrated in FIGS. 1 and 2 are coordinated by a charging current source 15 that supplies direct current for charging the ignition condenser 20. With the help of FIGS. 3 through 7 there are now described embodiments in which the ignition condenser is charged by an alternating current whose frequency corresponds to the frequency of the AC welding current.

Also in FIGS. 3 through 7 the components and assemblies already explained with the help of FIGS. 1 and 2 are shown with corresponding reference characters.

Figure 3:
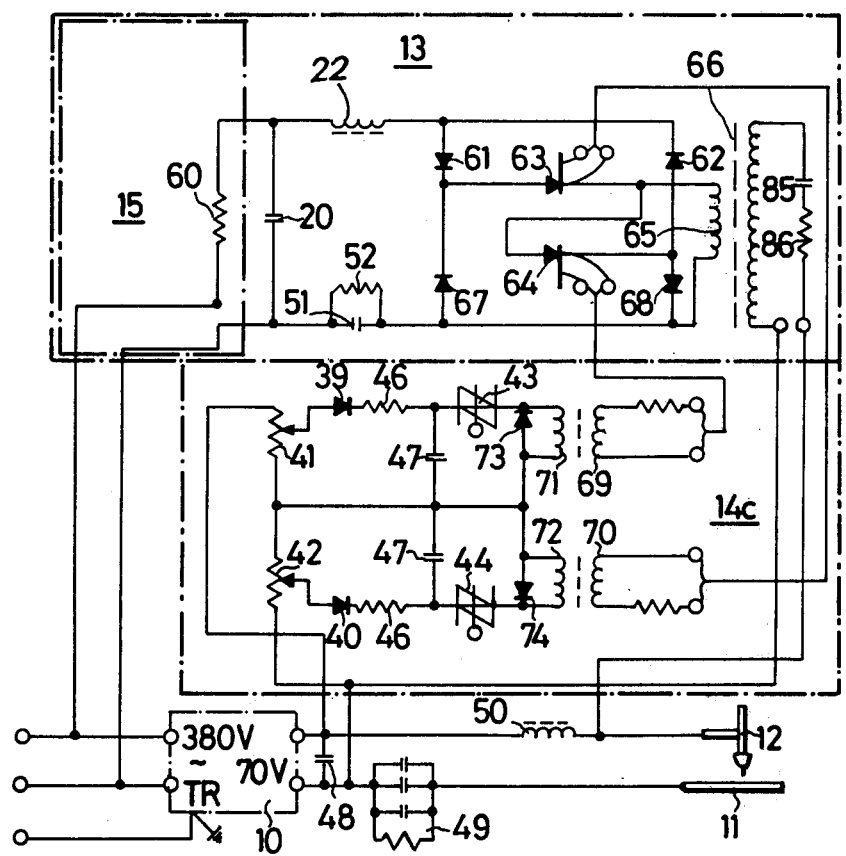

As FIG. 3 notes, the AC for charging ignition condenser 20 is taken directly from the 200, 380 or 500 volt primary side of the welding current source 10 through a protective resistor 60 of about 1000 ohms, so that the input power of assembly 13 is supplied without an intervening transformer. The power unit has two discharge circuits for the energy accumulated in ignition condenser 20, in that each of two rectifiers 61, 62 is connected respectively in series with a different one of two switches 63, 64 as well as with the primary winding 65 of pulse transformer 66.

In addition an isolation condenser 51 bridged by discharge resistor 52 is shown in the discharge circuit.

Each of the two discharge current paths shows a by-pass rectifier 67, 68 in series with the respective switches 63, 64 and with the primary winding 65.

The trigger unit 14c is constructed like that described in FIG. 2, however, the discharge of ignition control condensers 47 flows through four-layer diodes 43, 44 as well as through transformers 69, 70. The primary windings 71, 72 of the transformers 69, 70 are by-passed with diodes 73, 74.

In the exemplification of FIG. 3 the 380 volts/50 Hertz AC is galvanically isolated from the welding current circuit, first by means of the isolated windings of the pulse transformer 66, and second by means of the two low voltage transformers 69 and 70.

Figure 4:
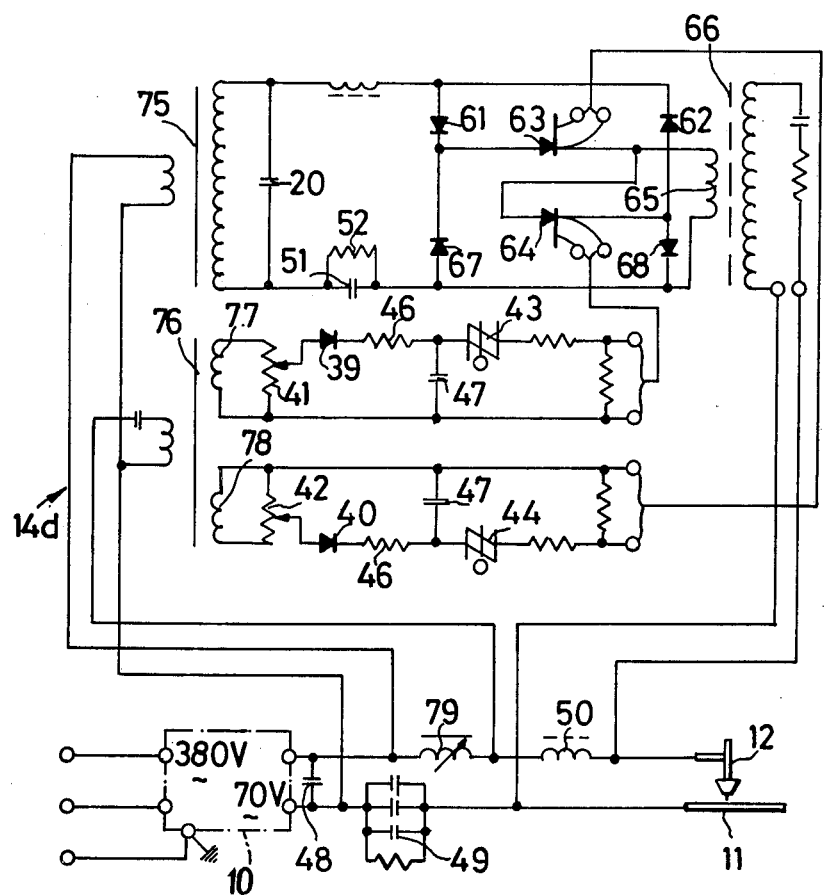

In FIG. 4 there is illustrated an arrangement that shows a power unit corresponding to that of FIG. 3. However, the charging of ignition condenser 20 comes from the secondary of transformer 75 which has isolated primary and secondary windings and is connected to the output of current source 10. The supply to trigger unit 14d is also connected to the output side of current source 10, but downstream of an inductor 79. An input transformer 76 (70 volts/20 volts) having an isolated primary and two secondary windings 77, 78 isolated from each other, couples the trigger unit to the current source.

The power unit transformer 75 is thus connected to the output of source 10 upstream of the adjustable welding current inductor 79, while the input of transformer 76 is connected downstream of inductor 79. The phase shift (60°–70°) thus obtained makes sure that the ignition condenser 20 is charged before the trigger pulse is generated.

The switches 63 and 64 in the embodiments of FIGS. 3 and 4 are thyristors to which appropriate trigger units are connected. In advantageous alternative constructions switches 63 and 64 can be current—or voltage—dependent switching members such as Dynistors, spark gaps, etc.

Figure 5:
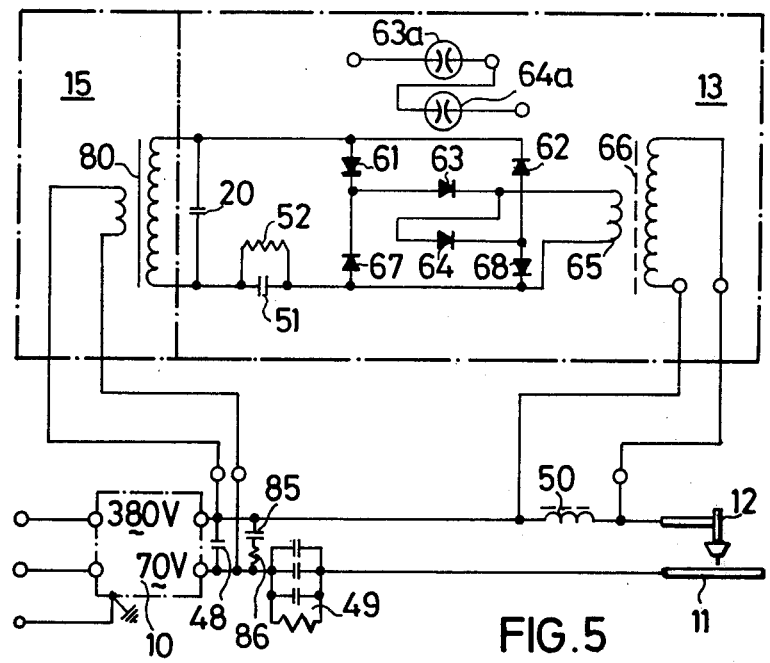

A construction with Dynistors which is shown in FIG. 5 has the advantage that no separate trigger units are needed. This arrangement consists only of one power unit 13 which is constructed to correspond to the power unit of FIG. 4. Thus the AC charging current source 15 comprises a transformer 80 with isolated primary and secondary windings of which the primary voltage corresponds to the free-running welding voltage (about 70 volts) and the secondary voltage of which corresponds to the switching (about 200 volts) or working voltage (200–800 volts) of the semiconductor components. The pulse transformer 66 of that arrangement advantageously has a transformation ratio from the primary voltage (200–800 volts) to the secondary voltage (2500–7500 volts), which is approximately between 1:8 and 1:40. Instead of the dynistors or equivalent semiconductors, spark gaps can be used as switch elements as shown in FIG. 5 at 63a and 64a. In this way the AC for charging the ignition condenser 20 is advantageously supplied from a transformer 80 the primary voltage of which corresponds to that of the welding current source 10, and the secondary voltage corresponds to that needed by the length of the spark gap, about 1000 to 3000 volts. It is further preferred in this combination that the pulse transformer in the discharge circuit of the ignition condenser have a transformation ratio between primary and secondary which is at least 1:1, preferably 1:2.5. Additionally useful are primary winding turns for 1000–3000 volts and secondary turns for 2500–7500 volts.

In the apparatus illustrated in FIG. 5, when the ignition condenser 20 reaches a predetermined voltage, the voltage-dependent switching elements are switched on and the condenser 20 discharged through the isolation condenser 51 and the pulse transformer 66. By means of the isolation condenser 51 there is obtained only two pulses of alternating polarity in each period.

Figure 6:
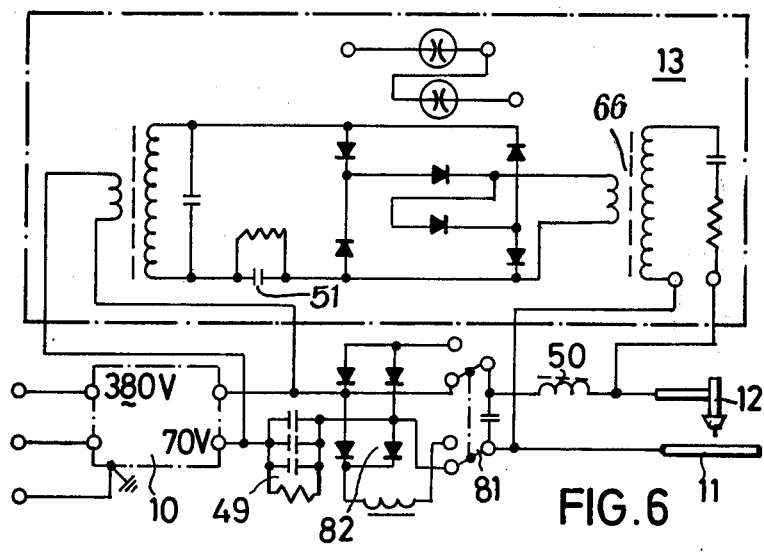

FIG. 6 shows the apparatus of FIG. 5 in combination with a welding supplement for selective direct or alternating current welding, whereby the current source 10 is selectably switched by means of switch 81 to the added switchable rectifier 82.

The ignition apparatus of the other figures can also be used in this way.

When welding with alternating current the apparatus operates during ignition in the same way as during welding. When welding with direct current on the other hand, the ignition apparatus is automatically switched off after the ignition inasmuch as the input voltage for direct current welding is too low to operate the ignition apparatus, and no breakdown voltage can be developed in the ignition apparatus.

It should further be noted that the ignition apparatus can also be used to ignite direct welding current from three-phase alternating current bridge rectifiers as well as from other types of welding rectifiers; in the three-phase arrangements two of the three alternating current conductors can be connected to the bridge rectifier.

Figure 7:
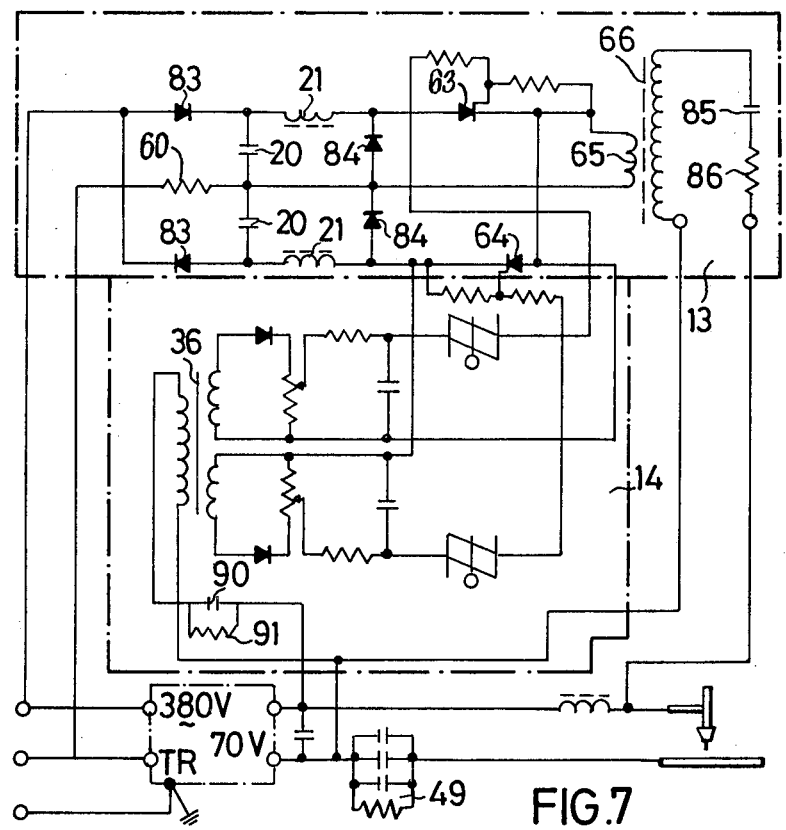

In the embodiment according to FIG. 7 two ignition condensers 20 are shown in the power unit 13, whereby one is used to supply the positive pulses and the other the negative pulses. The charging of the ignition condensers 20 is effected through diodes 83, while by-pass rectifiers (diodes) 84 are shown for dissipating the magnetic energy in the pulse transformer 66.

The construction of trigger unit 14 corresponds to that of unit 14a in FIG. 1.

Figure 8:
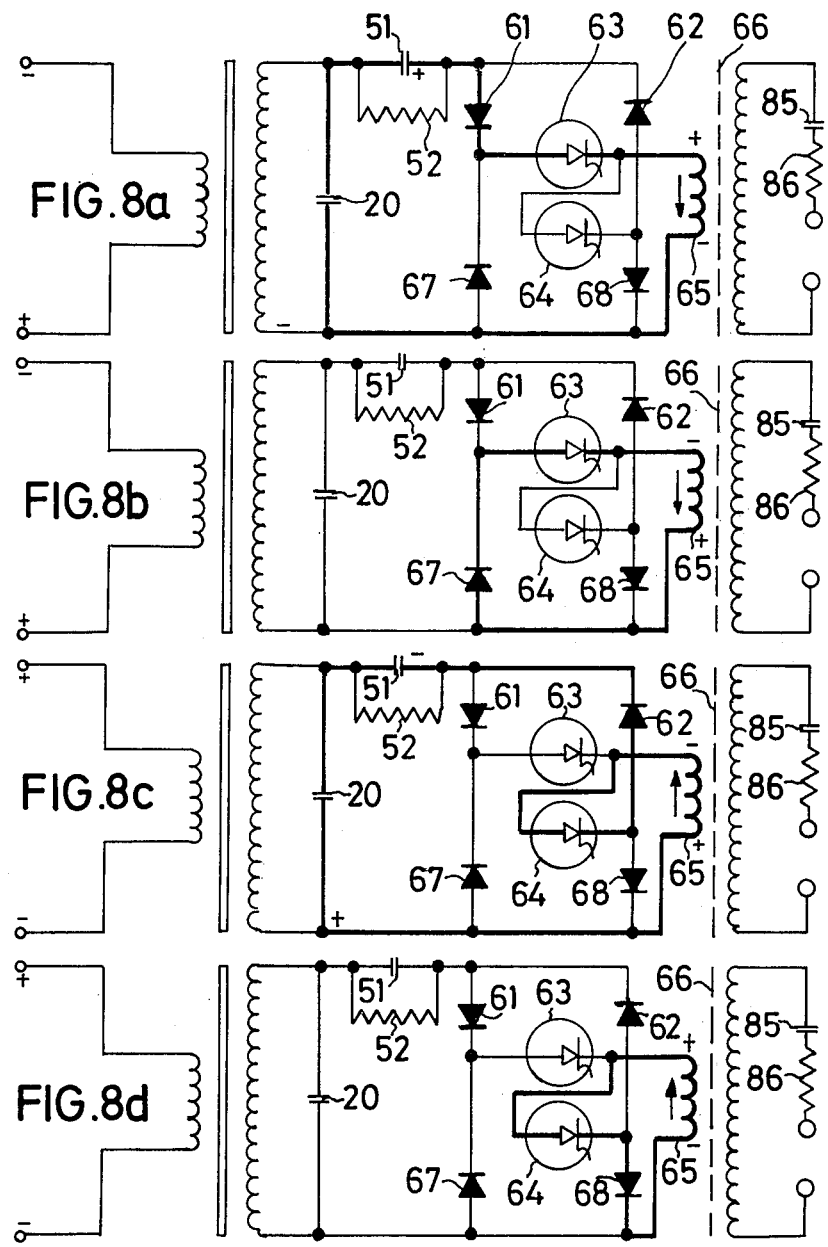
FIGS. 8a through 8d are abbreviated circuit diagrams that show current paths in the discharge circuit of the ignition condensers during successive stages in one period of the welding AC in the arrangements according to FIGS. 3 through 6.
Figure 9:
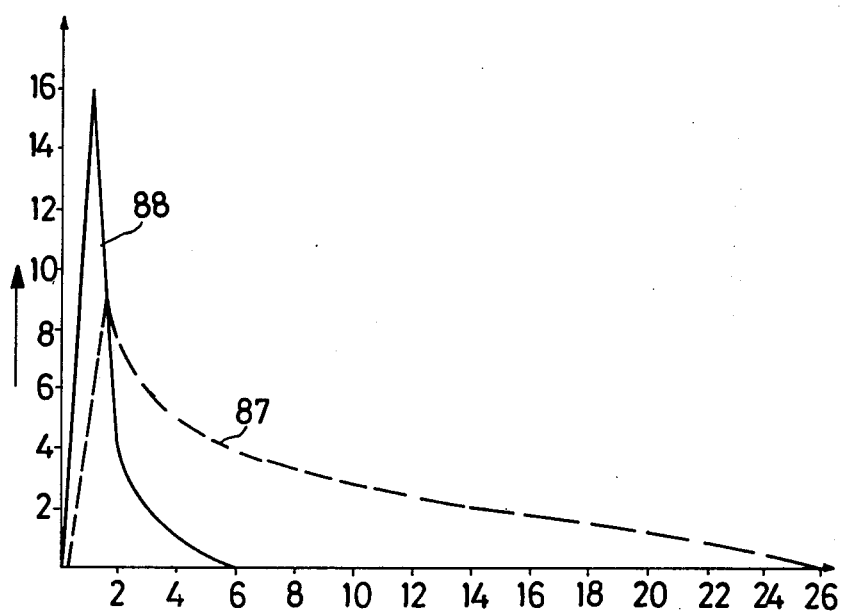
FIG. 9 shows the timewise current flow of dual ignition pulses according to the present invention.

In the exemplification according to FIGS. 1 and 7 an isolation condenser 90 with a high-ohm discharge resistor 91 is shown in the primary circuit of transformer 36, so that the primary winding of transformer 36 is not thermally overloaded by connection to the DC voltage component developed downstream of the condenser assembly 49 when welding, In FIGS. 8a through 8 d there is illustrated the current flow in the discharge circuit of the ignition condenser 20 over one period of AC welding. With the help of the following description the functioning of the arrangements according to FIGS. 3 through 6 is explained:

FIG. 8a shows the ignition condenser 20 charged by a positive half wave and at the instant of discharge when thyristor 63 receives a control pulse. Discharge follows in the discharge circuit that includes in series, ignition condenser 20, isolation condenser 51, diode 61, thyristor 63, as well as the primary winding 65. The discharge circuit is shown by heavy lines in FIG. 8a. By the condenser discharge there is produced in the pulse transformer a positive ignition pulse shown in FIG. 9 at 88. The condenser 20 is thereby discharged to the point that its voltage corresponds to the voltage across isolation condenser 51 which is charged up from the ignition condenser. When both condenser voltages are equally high, the ignition condenser discharge current becomes zero and both condenser voltages oppose each other. The thyristor 63 then switches off after its release time (about 10 to 50 microseconds) runs out. In the meantime the pulse transformer 66 becomes magnetized and consequently retains a certain amount of accumulated magnetic energy.

The voltage in the pulse transformer than reverses its polarity, the transformer 66 now operating as a generator and the accumulated energy drives a short-circuited current over a discharge current path — shown in heavy lines in FIG. 8b — consisting of the primary winding 65, the by-pass rectifier 67 and the thyristor 63. The accumulated energy is thereby dissipated before the thyristor is switched off.

Also while the thyristors are switched off, the isolation condenser 51 discharges through the resistor 52 in a maximum time of 10 milliseconds.

The ignition condenser 20 is in this interval charged up in the opposite polarity by the second (negative) half wave of the alternating current, and the thyristor 64 then becomes conductive, developing by the discharge of condenser 20 a second ignition pulse opposite in polarity to that of the first pulse, to stabilize or ignite the next welding current half wave. This condenser discharge is through the discharge circuit shown in heavy lines in FIG. 8c, consisting of primary winding 65, condensers 20 and 51, rectifier 62 and thyristor 64.

This discharge continues until the opposing voltages of condensers 20 and 51 are again equally large. The thyristor 64 switches off after its release time expires, due to the drop-off of discharge current. The resulting pulse causes another build-up of magnetic energy in the pulse transformer. The primary winding 65 then again functions as a generator and drives a short-circuit current through the discharge path made up of primary winding 65, by-pass rectifier 68, and thyristor 64, so the magnetic energy is dissipated before the thyristor cuts off.

The isolation transformer 51 then against discharges itself and the foregoing can then be repeated for the next period of the welding AC current.

The current passages illustrated and described in connecton with FIGS. 8a through 8d take place altogether during one period of the welding AC current. There is also thus produced for each half wave an ignition pulse having a duration of for example 0.3 to 3 microseconds, which pulse has the same polarity as the welding current half wave.

Reverse currents due to the energy accumulated in transformer 66 have no effect on the length and form of the ignition pulses; due to the timely short-circuiting of the primary side this energy is not transferred to the secondary side or to the welding current circuit.

As further set out above in FIGS. 1 through 7, a condenser 85 and a resistor 86 are shown in series in the secondary circuit of the pulse transformer 25 or 66. This condenser which is charged up by the idle or welding voltage, serves to produce a low-voltage pulse 87 superimposed on the ignition pulse. Pulse 87 is caused by the discharge of condenser 85 at the time the primary winding of transformer 25 or 66, and thus the secondary winding as well, is short-circuited. This low-voltage pulse has for example a duration approximately in the range between 10 and 50 microseconds. It is additionally advantageous for the capacitance value of condenser 85 to be at least 4, for example 10, times as large as that of the ignition condenser. Preferred values for apparatus with semi-conductor type switches are:

Condenser 85    5 Microfarads at about 45 to 100 volts
Resistor 86    5 Ohms
Condenser 20    0.5 Microfarad at 400 volts There is accordingly available for ignition and stabilization a combined pulse consisting of a short high voltage pulse (0.3 to 3 microseconds) and a longer (for example 25 microseconds) low-voltage pulse, and whose ignition and stabilization characteristics are better than in prior art arrangements.

It is also advantageous in the exemplifications according to FIGS. 1 through 7, to design the inputs of the charging currents sources 15 for various input voltages. Thus by selective connection (200 volts or 380 volts) the apparatus can be adjusted for pulses of about 3250 volts to 6000 volts, so that there is assurance of not exceeding the permitted maximum high frequency interference at a distance of 15 meters for operation in residential areas at 3250 volts, and at a distance of 50 meters for factory and industrial areas at 6000 volts.

The circuit constants and time durations given above are for 50 Hertz power supplies, and are to be appropriately modified for use with 60 Hertz power supplies that are standard in this country.

Obviously many modifications and variations of the present invention are possible in the light of the above teachings. It is, therefore, to be understood that within the scope of the appended claims the invention may be practiced otherwise than as specifically described.

What is claimed:

1. A device for stabilization of alternating current welding arcs and for the ignition of alternating current or direct current welding arcs by stablization or ignition pulses of alternate polarity, which pulses are generated by at least one discharged capacitor charged from a current source and discharged by a discharge circuit comprising two controllable discharge switches, rectifier means, and a pulse transformer with primary and secondary windings, each switch being connected to supply the transformer primary with discharge current in a different direction, the transformer secondary supplying the stabilization or ignition pulses, and the rectifier means being connected to form short-circuiting paths through the respective switches to dissipate from the transformer primary the energy liberated by its magnetic flux after each pulse, regardless of its polarity.

2. A device for generating pulses that stabilize alternating current welding arcs and ignite alternating current or direct current welding arcs, said device comprising a discharge capacitor connected for charging from a current source and for discharging through a discharge circuit comprising first and second controllable discharge switches, a rectifier, and a pulse transformer with a primary winding having first and second parts and a pulse output winding, one pole of the discharge capacitor being connected to one end of both primary winding parts, the other ends of each primary winding part being connected through the respective switches to the second pole of the discharge capacitor to deliver capacitor discharges in opposite directions to the primary winding, said rectifier being connected between the poles of the capacitor to form across the primary winding parts short-circuiting paths that include the respective switches, for dissipating current generated by the transformer flux after each capacitor discharge is completed, regardless of the direction.

3. In a welding arc igniting and stabilizing circuit having a pulse transformer with input winding means connected for receiving current surges and output winding means connected to deliver igniting and stabilizing pulses between the workpiece being welded and the welding electrode, the improvement according to which the input winding means is connected in an input network that alternately passes current surges of opposite polarity through the input winding means and causes the output winding means to deliver consecutive pulses of opposite polarity, and the input network contains passive rectifier means connected through selectable switches to short circuit the electrical energy developed in the input winding means by the transformer's magnetic flux at the completion of each input surge, and to effect such short-circuiting through the respective switches of the energy developed by the surges of the respective polarities.

4. The combination of claim 3 in which the input network contains energy-supplying capacitor means, the switches are connected to also switch energy from the capacitor means to supply the input surges through the input winding means, and the rectifier connection through the respective switches makes discharges paths that temporarily short-circuit the winding means at the completion of each surge.

5. The combination of claim 4 in which the switches are connected for triggering discharges from the capacitor means and remain conductive for a short period after the completion of the discharges to thus establish the short-circuits for the energy liberated by the magnetic flux built up because of the discharges.

* * * * *